United States Patent Office.

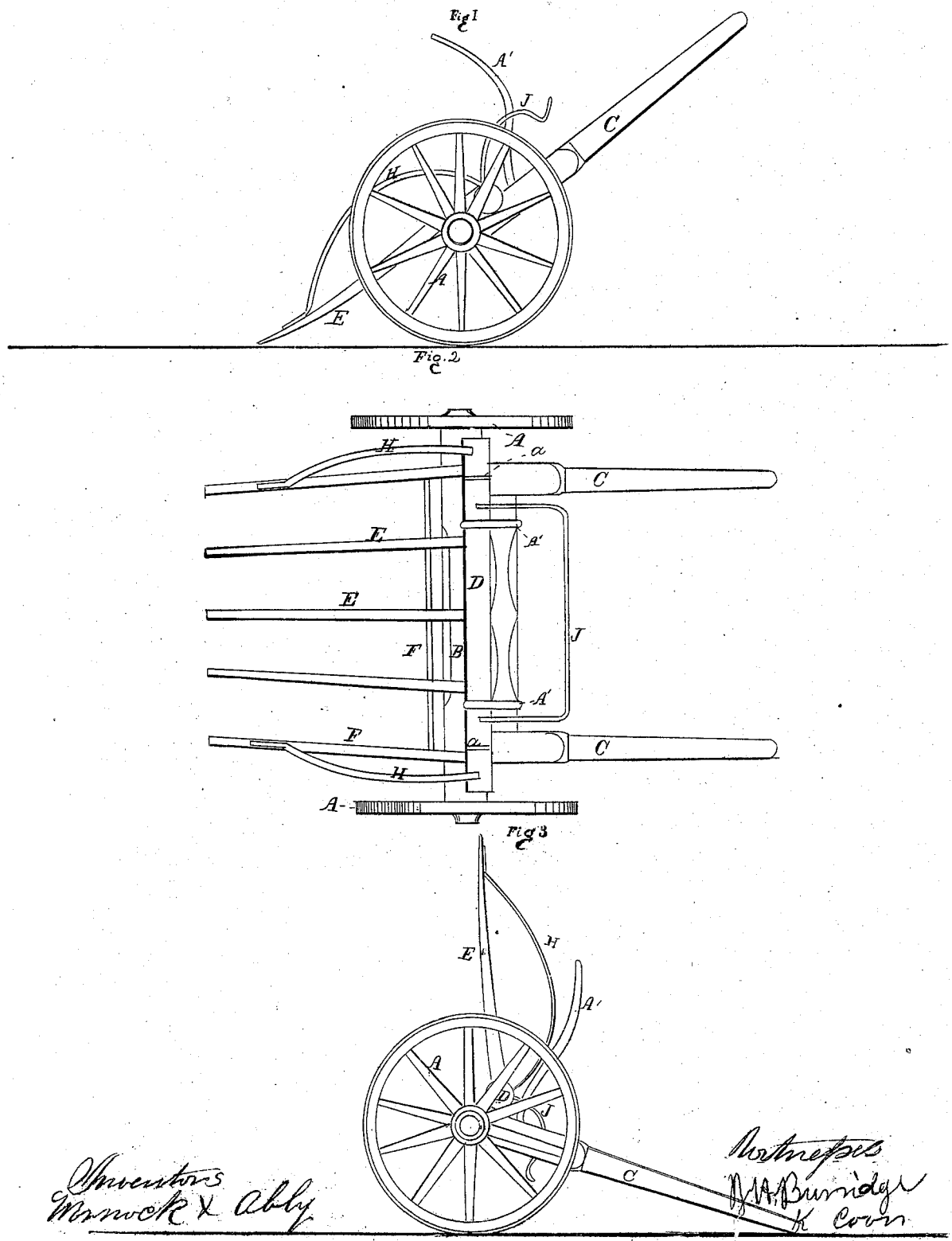

ROBERT WARNOCK AND CHARLES ABBEY, 2D, OF RIDGEVILLE, OHIO.

Letters Patent No. 80,523, dated July 28, 1868.

IMPROVEMENT IN GRAIN-RAKES.

*The Schedule referred to in these Letters Patent and making part of the same.*

TO ALL WHOM IT MAY CONCERN:

Be it known that we, ROBERT WARNOCK and CHARLES ABBEY, 2d, of Ridgeville, in the county of Lorain, and State of Ohio, have invented certain new and useful Improvements in Machines for Gathering Flax, Corn, Grain, &c.; and we do hereby declare that the following is a full and complete description of the same, reference being had to the accompanying drawings, making a part of this specification, in which—

Figure 1 is a side view of the machine while raking.

Figure 2, a view of the top.

Figure 3 is a side view.

Like letters of reference refer to like parts in the several views.

A, fig. 2, is a pair of wheels supporting the axle-tree B, and from which proceed the arms or handles, C, by means of which the machine is held and guided.

D is a roller, secured to the axle-tree by the bands a.

From said roller proceed the teeth E, which, together with the roller, constitute the rake F.

G is a rod for supporting and bracing the teeth.

H are guides.

A' are arms, the purpose of which will hereinafter be shown.

The practical use of this machine is for taking up grain from the swath, for the purpose of binding the same into bundles, and which operation is as follows: The operator holds the machine by the handle S C, when in the position shown in fig. 1. In this position, the points of the teeth are shown as being upon the ground. Now, in pushing the rake forward, the grain will gather upon the rake, and, as it accumulates, the butts are kept even by the guides. When sufficient for a bundle has gathered upon the rake, the handles are dropped to the position shown in fig. 3, thereby elevating the rake from the ground. The rake is then made to assume a vertical position by the operator, by placing his foot upon the brake J, thereby compressing the grain between the rake and the arms A', in which condition the bundle is tied. This being done, it is thrown from the machine, and the operation again repeated.

By the use of this machine much labor is saved, in the matter of raking, as the grain is lifted from the ground within easy reach of the binder, so that he is not compelled to stoop low, in order to take up the grain from the ground, and thus avoids the hard and tiresome act of stooping, which ordinarily is the most severe part of the work.

This machine is well adapted to raking nay, where a hand-rake is generally used, the guards or guides preventing the hay from running back upon the wheels, so that a considerable quantity will accumulate without obstruction, which can then be wheeled to the wagon or stack.

What I claim as my improvement, and desire to obtain by Letters Patent, is—

The rake F, guards H, arms A', handles C, and wheels A, all constructed and combined to operate in the manner as and for the purpose set forth.

ROBERT WARNOCK,
CHARLES ABBEY, 2D.

Witnesses:
W. H. BURRIDGE,
K. COON.